Figure 2:
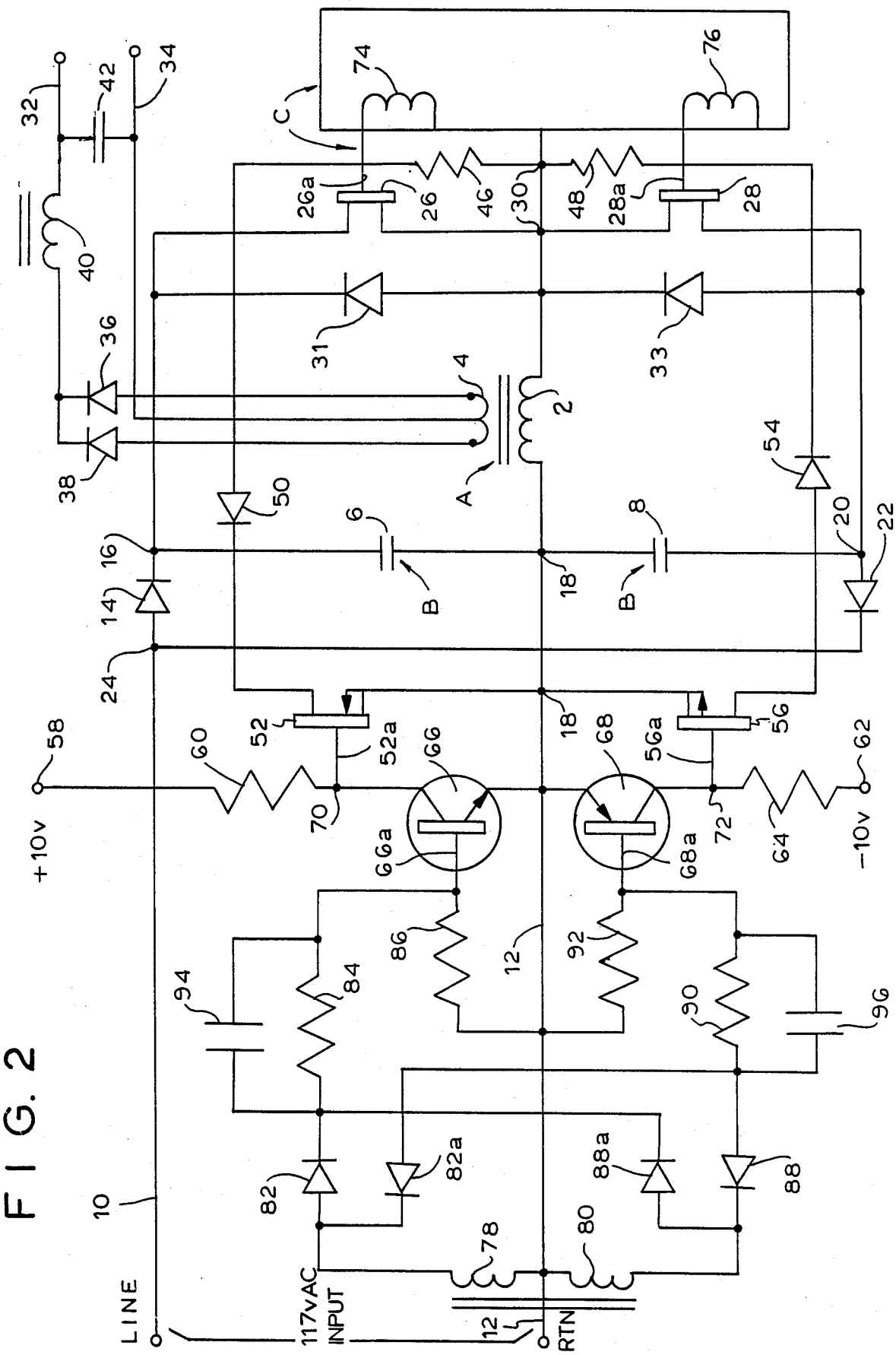

United States Patent [19]

Hill

[11] Patent Number: 4,802,078

[45] Date of Patent: Jan. 31, 1989

[54] ACTIVE SNUBBING CIRCUIT FOR SWITCHING MODE POWER SUPPLY

[75] Inventor: Jeremy R. Hill, Weston, Conn.

[73] Assignee: Power Pac Inc., South Norwalk, Conn.

[21] Appl. No.: 42,870

[22] Filed: Apr. 27, 1987

[51] Int. Cl.[4] .......................................... H02M 7/5387
[52] U.S. Cl. .......................................... 363/56; 363/17; 363/132
[58] Field of Search .......................... 363/17, 56, 132

[56] References Cited

U.S. PATENT DOCUMENTS

| | | | |
|---|---|---|---|
| 3,119,057 | 1/1964 | Wilson | 363/56 |
| 4,017,784 | 4/1977 | Simmons et al. | |
| 4,063,306 | 12/1977 | Perkins et al. | 363/56 |
| 4,092,708 | 5/1978 | Gerding et al. | 363/56 |
| 4,384,320 | 5/1983 | Incledon et al. | 363/56 |
| 4,424,556 | 1/1984 | Maeda et al. | 363/17 |
| 4,456,949 | 6/1984 | Incledon | 363/26 |
| 4,519,023 | 5/1985 | Lester | 363/56 |
| 4,533,986 | 8/1985 | Jones | 363/17 |
| 4,542,440 | 9/1985 | Chetty et al. | 361/111 |
| 4,564,896 | 1/1986 | Akerson | 363/56 |
| 4,566,059 | 1/1986 | Gallios et al. | 363/17 |
| 4,586,118 | 4/1986 | Mihalka | 363/17 |
| 4,639,849 | 1/1987 | Noworolski et al. | 363/132 |

FOREIGN PATENT DOCUMENTS 202888  12/1982  Japan ..................... 363/56

Primary Examiner—William H. Beha, Jr.
Attorney, Agent, or Firm—James & Franklin

[57] ABSTRACT

In a switching mode power supply a snubbing circuit, provided to dissipate the energy of voltage overshoots, is so controlled as to be effective only during the switch-off periods, thereby to dissipate substantially only the voltage overshoot energy.

4 Claims, 2 Drawing Sheets

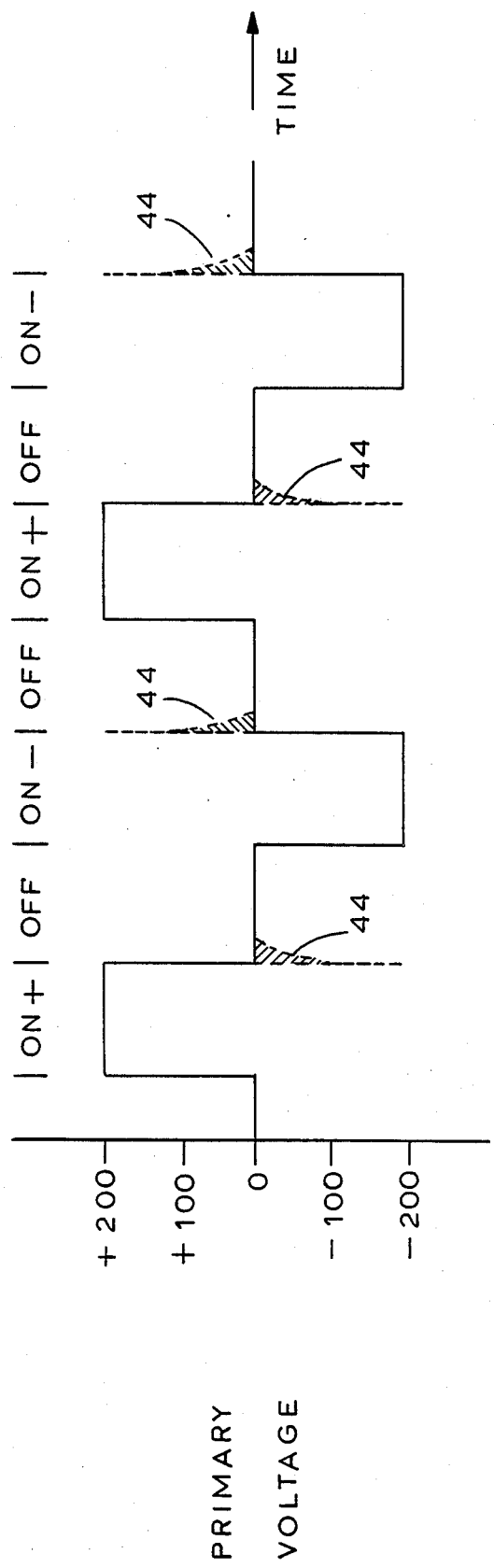
F I G. 1

ACTIVE SNUBBING CIRCUIT FOR SWITCHING MODE POWER SUPPLY

This invention relates to a switching mode power supply provided with a snubbing circuit which is controlled so as to maximize dissipation of undesired voltage overshoot energy and minimize dissipation under other circumstances, thereby greatly to improve overall efficiency.

Line-operated power supplies, including those operated in a switching mode, are generally required to provide isolation between the input line and output line or lines. This is usually produced by a power transformer connected directly to the input line. When the conversion is accomplished at the usual AC input frequency of around 60 HZ these transformers become increasingly large, heavy and expensive if the power output of the supply exceeds a few watts. Because transformer weight and size are approximately inversely proportional to the input frequency, the art has turned to switching mode power supplies in which power conversion is effected at very high frequencies, such as 10 kHZ to 100 kHZ, with the result that at those frequencies the transformer, still required for isolation, may be made adequately small and light. The use of such high switching frequencies has the further advantage of reducing size of the capacitors utilized in the circuit for filtering purposes. Modern active devices, especially power MOSFETs, can accommodate power switching at the frequencies in question, and in particular at frequencies on the order of 100 kHZ.

This increase in operating frequency, though highly advantageous, has presented an undesirable trade-off. An ideal isolating transformer would have perfect coupling between primary and secondary and no leakage inductance, but that ideal is not realized in practice. A significant amount of leakage inductance is always present as a practical matter, and the adverse effect of that leakage inductance on the power supply increases as operating frequencies are increased. The leakage inductance, mainly in the secondary of the transformer, stores energy during the conduction (switch-on) parts of the cycle, and that stored energy must be dissipated during the non-conduction (switch-off) periods. That energy, as it dissipates, is coupled back into the primary circuit, producing large primary voltages which, if not controlled, would damage the semiconductors in both the primary and secondary circuits. The energy dissipation is a waste, reducing the overall efficiency of the power supply, and the danger to the semi-conductors in the circuit must be taken care of.

These problems have been solved in the past through the use of a power dissipation or snubbing circuit, usually a capacitor and resistor in series connected across the primary winding. In, for example, a line-operated switching mode power supply operating at 65 kHZ and delivering 150 amperes at 5 volts, typically 50 watts may be dissipated by the snubbing circuit to bring the unwanted stored energy under control. This represents about 6% or 7% of the total output power, so overall efficiency is significantly reduced. The 50-watt dissipation figure applies to full power operation, but the prior art snubbing circuit dissipates energy at all times, even with zero output power, thus giving rise to worse efficiency of the power supply at lower output power levels than at full load.

It is the prime object of the present invention to provide a power supply in which the action of the snubbing circuit is controlled in such a manner as to dissipate only that power which must be dissipated if the power supply is to function properly.

Another object of the present invention is to provide a power supply with a snubbing circuit in which energy is only dissipated as required to control stored energy due to transformer leakage reactance, with no energy being dissipated as a result of switching transitions.

It is a further object of the present invention to provide a power supply with a snubbing circuit in which dissipation is reduced to near zero with no output power delivered and is at an effective value as the power output increases.

It is yet another object of the present invention to provide a power supply in which overall efficiency is improved significantly at full load and to an increasing degree at lower power levels.

In accordance with the present invention a snubbing circuit is provided which is controlled or switched so as to be operative during the switch-off periods of the power supply, when secondary leakage inductance generates large voltage spikes, thereby to dissipate the dangerous energy involved in those spikes, but to be inoperative during the switch-on periods of the power supply, so as not to dissipate any appreciable portion of the useful energy transmitted by the power supply. The snubbing circuitry involves a power-dissipating element such as a resistor in series with a switching transistor, that transistor being rendered conductive only during the switch-off periods of the power supply but being rendered nonconductive during the switch-on periods of the power supply, thus rendering the power-dissipating elements inoperative during power-transmitting periods. A control circuit for those switching transistors is synchronized with the switching of the power supply, preferably by being energized by the same source which energizes the power supply switching. Accurate control of that synchronization, with appropriate speed-ups and delays as may be appropriate for turn-ons and turn-offs of various circuit components, can readily be accomplished through simple circuit design.

To the accomplishment of the above, and to such other objects as may hereinafter appear, the present invention relates to a switching mode power supply with a controlled snubbing circuit, as defined in the appended claims and as described in this specification, taken together with the accompanying drawings, in which FIG. 1 is a typical graph of the voltage in the primary of the isolation transformer of the power supply, with the undesirable voltage spikes which would occur in the absence of the snubbing circuit of the present invention being shown in the shaded areas; and FIG. 2 is a circuit diagram of a preferred embodiment of the present invention.

The snubbing problem arises in many different types of power supplies, of which power supplies with AC inputs and DC outputs (such as is disclosed in Gerding et al. U.S. Pat. No. 4,092,708 of May 30, 1978 entitled "Power Supply With Overcircuit Protection") and DC inputs and DC outputs (such as is disclosed in Incledon et al. U.S. Pat. No. 4,384,320 of May 17, 1983 entitled "Push-Pull Switching Mode Inverter-Type Power Supply" and U.S. Pat. No. 4,456,949 of June 26, 1984 entitled "Overlap Control System For Push-Pull Switching Mode Inverter Power Supply") are typical. This invention is here specifically disclosed as embodied in a power supply having an alternating current input and a direct current output, but it will be understood that this is by way of exemplification only, and that it is adapted for use in other types of power supplies as well.

The power supply of the present invention is provided with a power transformer generally designated A having primary winding 2 and secondary winding 4. The primary winding 2 is energized by means of a DC voltage supply generally designated B and comprising capacitors 6 and 8 operating in conjunction with a switching means generally designated C which controls the time and direction of the current passing through the primary winding 2. An alternating input voltage, such as a conventional 117 volt 60 HZ power supply, is connected across lines 10 and 12. Line 10 is connected by rectifier 14 to node 16 which is in turn connected to one end of capacitor 6, the other end of the capacitor 6 being connected to node 18 which is in turn connected to AC line 12 and to one end of the capacitor 8. The other end of the capacitor 8 is connected to node 20 which, through rectifier 22, is connected to node 24 on the AC line 10. This circuitry results, as is well known, in the production of a DC voltage across the nodes 16 and 20 which is approximately twice as large as the amplitude of the input AC voltage.

The switching means C comprises transistors 26 and 28. The output electrodes of the transistor 26 are connected between node 16 and node 30, the latter being connected to one end of the primary winding 2, the other end of the primary winding 2 being connected to the node 18. The output electrodes of the transistor 28 are connected between nodes 30 and 20. Rectifiers 31 and 33 are connected between nodes 16 and 20 across the capacitors 6, 8 and the transistors 26, 28 in order to protect transistors 26 and 28 from damaging reverse voltages due to very short term spikes.

The switching means C, actuated in any desired manner as is well known in the art (see, for example, the patents cited above), is operatively connected to the control electrodes 26a and 28a of the transistors 26 and 28 and is effective to make transistor 26 conductive while transistor 28 is non-conductive, followed by a period in which both transistors are non-conductive, followed by a period in which transistor 28 is conductive and transistor 26 is non-conductive, followed by a period in which both transistors are non-conductive, and so on. This produces in the primary winding 2 of transformer A voltages such as are shown in solid lines in FIG. 1. As indicated, the cyclic frequency may be quite high, such as 100 kHZ. The primary voltages induce corresponding voltages in the secondary winding 4, which are then transmitted to the output lines 32 and 34. In the embodiment here illustrated the secondary transformer winding 4 has its midpoint connected to the output line 34 and its ends connected to the output line 32 via rectifiers 36 and 38, thereby to produce a rectified DC output which may be filtered by series inductance 40 and shunt capacitor 42.

The existence of leakage reactance in the secondary winding 4 stores energy which, when the current through the primary winding 2 is interrupted, couples back into the primary winding 2, producing therein the voltage spikes 44 shown in FIG. 1 in broken lines, the shaded area within those spikes representing power which, for the reasons set forth above, must be dissipated.

In the power supply of the present invention energy dissipation or snubbing is accomplished by means of resistors 46 and 48. Resistor 46 is connected at one end to node 30 and at its other end, via rectifier 50, to one side of the output circuit of a power transistor 52, the other side of that output circuit being connected to the node 18. Similarly the resistor 48 is connected at one end to the node 30 and at its other end, via rectifier 54, to one side of the output circuit of power transistor 56, the other side of that output circuit being connected to the node 18. Thus the resistors 46 and 48 are each connected across the primary transformer winding 2, current can flow through them only in opposite directions respectively because of the opposite polarities of the rectifiers 50 and 54, and current can flow through them only when their respective power transistors 52, 56 are conductive. The transistor 52 may be an N-channel MOSFET, conductive only when a positive voltage is applied to its control electrode 52a, and the transistor 56 may be a P-channel MOSFET which will conduct only when negative voltage is applied to its control electrode 56a. The control electrode 52a is connected to a positive biasing source 58, such as 10 v. DC, by resistor 60, and the control electrode 56a is connected to a negative biasing source 62, such as minus 10 v. DC, by resistor 64.

The transistors 66 and 68 control the conductivity of transistors 52 and 56. The output circuit of transistor 66 is connected between node 70, located between resistor 60 and control electrode 52a, and the AC return line 12, while the output circuit of transistor 68 is connected between node 72, connected to the control electrode 56a, and that AC return line 12. The transistor 66 has a control electrode 66a and the transistor 68 has a control electrode 68a.

The circuitry for controlling the transistors 66 and 68 comprises a control which is synchronized with the switching of the transistors 26 and 28. As here specifically disclosed the switching means C comprises a pair of windings 74 and 76 which, when energized, render the control electrodes 26a and 28a of the transistors 26 and 28 respectively effective to make their respective transistors 26, 28 conductive. To control the transistors 66 and 68 a second pair of windings 78 and 80 are employed which are energized by the same means which energizes the windings 74 and 76. The winding 78 has one end connected to the AC return line 12 and its other end connected, via rectifier 82 and resistor 84, to the transistor control electrode 66a, and from there via resistor 86 to the line 12. The winding 80 has one end connected to the line 12 and the other end connected, via rectifier 88 and resistor 90, to the transistor control electrode 68a and from there via resistor 92 to the line 12. Rectifier 82a is poled oppositely to rectifier 82, rectifier 88a is poled oppositely to rectifier 88, and they are connected as shown. Capacitors 94 and 96 are connected across the resistors 84 and 90 respectively.

The operation of this circuit is as follows, it being assumed for purposes of explanation that when transistor 26 is rendered conductive by the switching means C that will correspond to the positive primary voltage time periods shown in FIG. 1 and when transistor 28 is rendered conductive that will correspond to the negative primary voltage periods of time shown in FIG. 1: In a first period of time, when the winding 74 of the switching means C renders transistor 26 conductive, so that current flows through the primary winding 2 in the "positive" direction, it being assumed that this occurs when the upper end of winding 74 is made positive, the upper ends of the windings 78 and 80 are also made positive. The control electrode 66a will be given a positive bias, rendering transistor 66 conductive, and the control electrode 68a of transistor 68 will be given a negative bias, making transistor 68 conductive. Transistors 66 and 68 will then shunt the positive bias 58 for control electrode 52a and the negative bias 62 for control electrode 56a to ground, making both transistors 52 and 56 non-conductive. As a result no current can flow through the snubbing resistors 46 and 48, and hence no dissipation takes place during this time of "positive" power transfer through the transformer A.

During the second period of time, when both transistors 26 and 28 are non-conductive, the primary voltage then being off, the windings 78 and 80 will likewise be unenergized. As a result neither of the transistors 66 or 68 will be conductive, the positive and negative biasing voltages 58 and 62 will be applied to the control electrodes 52a and 56a respectively, the transistors 52 and 56 will be conductive, and hence current can pass through the snubbing resistors 46 and 48. In fact, current will pass only through one of them, depending upon the direction of the spike 44 at that time.

During the next (third) operative period of time the windings 74 and 76 will be energized oppositely from what was the case during the first described period of time, the transistor 26 will remain non-conductive, the transistor 28 will become conductive, and hence the primary winding 2 will be energized in what is here called a negative sense. At the same time the windings 78 and 80 will be energized oppositely from the way that they were energized during the first described period of time, but because of the arrangement of the rectifiers 82, 82a, 88, 88a the transistors 66 and 68 will once again be rendered conductive, the control electrodes 52a and 56a will have their biasing voltages 58, 62 shunted away, the transistors 52 and 56 will become non-conductive, current will be prevented from passing through the resistors 46 and 48, and hence no snubbing or energy dissipation will take place.

During the next (fourth) operative period of time, corresponding to the next "off" period shown in FIG. 1, the situation will be the same as in the second described period of time—the windings 74 and 76 will be de-energized, the windings 78 and 80 will also be de-energized, transistors 66 and 68 will be non-conductive, transistors 52 and 56 will be conductive, and the appropriate one of the resistors 46 and 48 will be effective to dissipate the energy in the spike 44.

Capacitors 94 and 96 are provided to speed the shift of transistors 66 and 68 from non-conductive to conductive. This is desired to ensure that the snubbing resistors 46 and 48 are rendered inoperative before the transistor 26 or 28 becomes conductive. Resistors 60 and 64 have parameters so chosen, in association with the input capacitance of their respective transistors 52 and 56, as to provide an appropriate delay in the shift of transistors 52 and 56 from non-conductive to conductive.

It will be appreciated from the above that because the snubbing resistors 46 and 48 are rendered operative only during the "off" periods of the switch power supply they control and dissipate stored energy due to transformer leakage reactance, but they do not dissipate energy as a result of switching transitions. During the actual periods of power transmission they are not energy-dissipative at all. As a result dissipation is reduced to near zero with no output power delivered and during full power delivery dissipation is reduced by a factor of 10 or more when compared to prior art snubbing circuits. Overall efficiency is improved by about 5% at full load and by an increasing amount at lower power levels.

The embodiment here specifically disclosed is of a "T" type bridge circuit but this is for exemplary purposes only, and it will be understood that the invention is equally effective for different bridge topologies and configurations. Other variations in the specific circuitry may be made, all within the spirit of the invention as defined in the following claims.

I claim:

1. In a switching mode power supply comprising a transformer having primary and secondary windings, switching means operatively connected to said primary winding for applying an excitation voltage to the said primary winding, said excitation voltage comprising "on" times of alternating polarity separated by "off" times, and a snubbing circuit operatively connected to said transformer to dissipate overshoots, the improvement which comprises said snubbing circuit comprising first and second sections each comprising a power dissipating means, each of said first and second sections being active for a different polarity of said excitation voltage and each rendering its power dissipating means ineffective during both the "on" and "off" times of the active polarity of the other section and the "on" time of the active polarity corresponding to itself and rendering its power dissipating means effective during the "off" time of the polarity corresponding to itself.

2. The power supply of claim 1, in which said control means is connected between said primary winding and said power dissipating means and is effective to conductively connect said primary winding and said power dissipating means during said "off" times and to conductively disconnect said primary winding and said power dissipating means during said "on" times.

3. The power supply of claim 1, in which a rectifier polarized to be conductive in a direction corresponding to the polarity of the voltage overshoot to be snubbed is connected in the circuit including said primary winding and said first transistor means.

4. The power supply of claim 1, in which said power dissipating means comprises a resistance connected across said primary winding in series with first transistor means, said first transistor means having a control electrode connected to said switching means so that said first transistor means is effectively conductive during the "off" time of said switching means and is effectively non-conductive during the "on" time of said switching means, in which said switching means comprises a source of alternating voltage and in which the connection between the said switching means and the control electrode of said first transistor means comprises a second transistor means controllingly operatively connected to said first transistor means, operatively connected to said alternating voltage source and effective to render said first transistor means conductive and non-conductive during said "off" and "on" times respectively.

* * * * *